(12) United States Patent
Pall et al.

(10) Patent No.: US 8,341,619 B2
(45) Date of Patent: Dec. 25, 2012

(54) SIMPLIFYING INSTALLATION OF SOFTWARE MODULES ON HETEROGENEOUS REMOTE SYSTEMS

(75) Inventors: Inderbir Singh Pall, Jabalpur (IN); Pradeep Kumar Itharaju, Bangalore (IN); Bharat Shrikrishna Paliwal, Fremont, CA (US); Ramasubramaniyan Adhinarayanan, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 856 days.

(21) Appl. No.: 12/464,901

(22) Filed: May 13, 2009

(65) Prior Publication Data

US 2010/0293541 A1 Nov. 18, 2010

(51) Int. Cl.
 *G06F 9/445* (2006.01)
(52) U.S. Cl. ............................ 717/174; 717/176; 717/178
(58) Field of Classification Search ........................ None
 See application file for complete search history.

(56) References Cited

U.S. PATENT DOCUMENTS

| | | | | |
|---|---|---|---|---|
| 7,100,159 | B2 * | 8/2006 | Claiborne | 717/174 |
| 7,363,370 | B2 * | 4/2008 | Collazo | 709/224 |
| 7,581,062 | B2 * | 8/2009 | Ogasawara et al. | 711/114 |
| 2005/0172284 | A1 * | 8/2005 | Dandekar et al. | 717/174 |
| 2005/0209843 | A1 * | 9/2005 | Liu | 717/176 |
| 2005/0278723 | A1 * | 12/2005 | Feinleib et al. | 717/178 |
| 2006/0206458 | A1 * | 9/2006 | Tyma | 707/3 |
| 2007/0039009 | A1 * | 2/2007 | Collazo | 717/178 |
| 2007/0128899 | A1 * | 6/2007 | Mayer | 439/152 |
| 2008/0114933 | A1 * | 5/2008 | Ogasawara et al. | 711/114 |
| 2008/0232457 | A1 * | 9/2008 | Fallon et al. | 375/240 |
| 2009/0119660 | A1 * | 5/2009 | Redpath | 717/174 |
| 2009/0254890 | A1 * | 10/2009 | Kang et al. | 717/176 |
| 2010/0162201 | A1 * | 6/2010 | Shnaiderman et al. | 717/101 |

OTHER PUBLICATIONS

Heterogeneous computing From Wikipedia, the free encyclopedia [retrieved on Apr. 12, 2012]. Retrieved from the Internet<URL:http://en.wikipedia.org/wiki/Heterogeneous_computing>.*
Veeramuthu Rajaravivarma, Open Source Virtual Private Network Experience, 2009, ACM, 8 pages, <URL: http://delivery.acm.org/10.1145/1410000/1409890/p85-rajaravivarma.pdf>.*
Kimfong Lei, Strategic Decisions on Technology Selections for Facilitating a Network/Systems Laboratory using Real Options & Total Cost of Ownership Theories, 2003, ACM, 17 pages, <URL: http://delivery.acm.org/10.1145/950000/947139/p76-lei.pdf>.*
Taeho kwon, Automatic Detection of Unsafe Component Loadings, 2010, ACM, 11 pages, <URL: http://delivery.acm.org/10.1145/1840000/1831722/p1 07-kwon.pdf>.*
Aditya Rajgarhia, Performance and Extension of User Space File Systems, 2010, ACM, 8 pages, <URL: http://delivery.acm.org/10.1145/1780000/1774130/p206-rajgarhia.pdf>.*

(Continued)

*Primary Examiner* — Thuy Dao
*Assistant Examiner* — Hua Lu
(74) *Attorney, Agent, or Firm* — Narendra Reddy Thappeta

(57) ABSTRACT

An installer system provided according to an aspect of the present invention facilitates easy installation of software modules in a heterogeneous computing system in which many operating systems are installed in the remote systems. In an embodiment, the installer system performs different installation actions on different remote systems, depending on the specific operating system installed on the corresponding remote system and the specific software module being installed. Each installation action may be translated into one or more commands according to the syntax/semantics requirement of the respective operating system on the remote system.

18 Claims, 5 Drawing Sheets

OTHER PUBLICATIONS

Stephen Specht, Distributed Denial of Service: Taxonomies of Attacks, Tools and Countermeasures, 2004, Google Scholar, 8 pages, <URL: http://palms.ee.princeton.edu/PALMSopen/DDoS%20Final%20PDCS%20Paper.pdf>.*

Vikram Padman, Design of a Virtual Laboratory for Information Assurance Education and Research, 2002, Google Scholar, 7 pages, <URL: http://www.rozinov.sfs.poly.edu/~vlab/vlab_paper.pdf>.*

"Connecting Through Windows Firewall", "Microsoft Corporation", "http://windowssdk.msdn.microsoft.com/en-us/library/aa389286.aspx", Downloaded circa: May 2009, pp. 1-2.

"Java Secure Channel", "JCRAFT, Inc.", "http://www.jcraft.com/jsch/", Last modified Date: Feb. 16, 2009, pp. 1-2.

"Talha Bin Tariq", "Remote Command Executor", "http://talhatariq.wordpress.com/projects/remote-command-executor-xrce/", Downloaded circa: May 2009, pp. 1-21.

"Securing a Remote WMI Connection", "Microsoft Corporation", "http://windowssdk.msdn.microsoft.com/en-us/library/aa393266.aspx", Downloaded circa: May 2009, pp. 1-2.

"WMI Architecture", "Microsoft Corporation", "http://windowssdk.msdn.microsoft.com/en-us/library/aa394553.aspx", Downloaded circa: May 2009, pp. 1-2.

"WMI C++ Application Examples", "Microsoft Corporation", "http://windowssdk.msdn.microsoft.com/en-us/library/aa394558.aspx", Downloaded circa: May 2009, p. 1.

* cited by examiner

SIMPLIFYING INSTALLATION OF SOFTWARE MODULES ON HETEROGENEOUS REMOTE SYSTEMS

COPYRIGHT NOTICE

A portion of the disclosure of this patent document contains material which is subject to copyright protection. The copyright owner, Oracle Corporation, has no objection to the facsimile reproduction by anyone of the patent document or the patent disclosure, as it appears in the US Patent and Trademark Office patent file or records, but otherwise reserves all copyright rights whatsoever.

BACKGROUND OF THE INVENTION

1. Technical Field

The present disclosure relates to software installation and more specifically to simplifying installation of software modules on heterogeneous remote systems.

2. Related Art

Installation refers to the process of setting up a software module for execution in a digital processing system. Installation typically entails storing the software instructions/data (constituting the software module) in appropriate storage locations and performing any other configurations required to make the instructions/data ready for execution.

Installation may be performed locally (using the same system) or remotely (from another system termed the "installer system"). Remote installation is particularly useful when a software module is required to be installed on multiple systems (termed as "remote systems"). The installation is performed based on a communication path (e.g., using a network) established between the installer system and each remote system.

There are several environments where remote systems are heterogeneous. Heterogeneous systems require the installation actions from the installer systems to be different (either in terms of the actions themselves or in terms of the command syntax/semantics for a given action). Such differences are required, generally due to the interfaces expected by differences in the hardware and/or operating systems of the remotes systems.

Several challenges may be presented due to such differences. For example, different 'flavors' of the same software modules may need to be installed to correspond to the operating system and/or hardware of the specific remote system. In addition, the set of actions performed with respect to different types of remote systems may also be different in view of the differences in command syntax/semantics noted above.

In one prior approach, appropriate additional software (such as Cygwin software emulating Unix operating system, Java run time environment etc.) are installed and/or additional configuration is performed on each remote system such that the installer system can use at least substantially similar installation actions when installing on separate remote systems. However, the overhead associated with deploying the additional software on several remote systems, may not be acceptable.

It may be desirable that the installation of a software module on heterogeneous remote systems be simplified.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An installer system provided according to an aspect of the present invention facilitates easy installation of software modules in a heterogeneous computing system in which many operating systems are installed in the remote systems. In an embodiment, the installer system performs different installation actions on different remote systems, depending on the specific operating system installed on the corresponding remote system and the specific software module being installed. As the software automatically performs such installation actions, the user is shielded from the detail of having to specify different actions for remote systems of different operating systems.

According to another aspect of the present invention, the required installation actions are translated into one or more commands according to the syntax/semantics requirement of the respective operating system on the remote system. As a result, the required installation actions can be performed with minimal additional software requirements on the remote systems.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
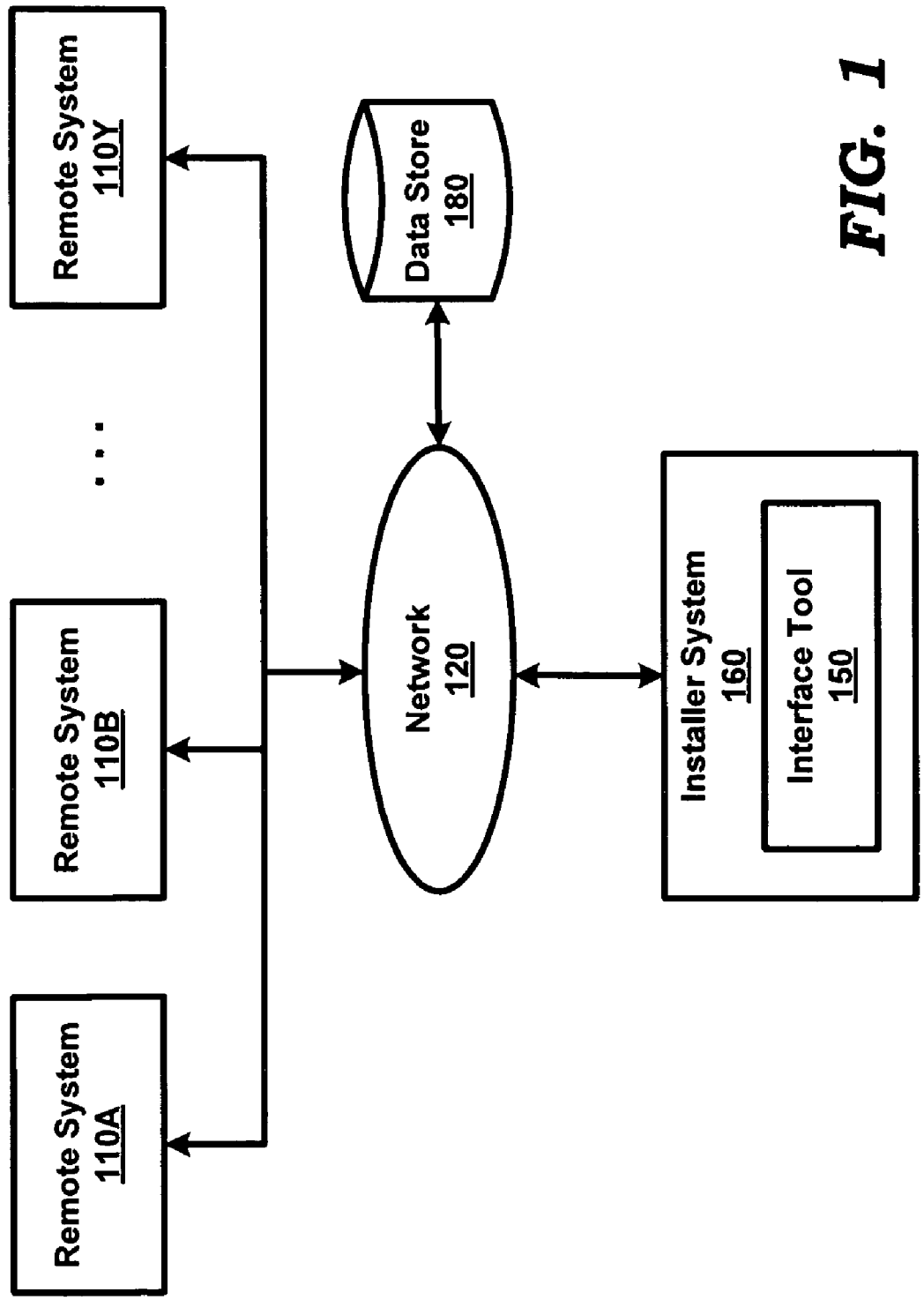
FIG. 1 is a block diagram illustrating the details of an example heterogeneous computing system in which several aspects of the present invention can be implemented.

FIG. 1 is a block diagram illustrating an example environment (computing system) in which several aspects of the present invention can be implemented. The block diagram is shown containing remote systems 110A-110Y, network 120, installer system 160 (shown containing interface tool 150) and data store 180.

Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between remote systems 110A-110Y, installer system 160, and data store 180. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data store 180 represents a non-volatile storage facilitating storage and retrieval of a collection of data. Data store 180 may maintain the flavors of the software modules and/or the set of actions to be performed corresponding to the type of the remote system. In one embodiment, data store 180 is implemented to maintain the data in the form of one or more files, each file identifiable by a corresponding file name.

Each of remote systems 110A-110Y represents a system such as a personal computer, workstation, mobile station, etc., or a server, such as a web/application server in which a software module is sought to be installed. Each of the remote systems may be pre-installed with a corresponding one of a set of operating systems, and as such remote systems 110A-110Y form a heterogeneous set of remote systems in which the same software module (or flavors thereof) is sought to be installed.

As is well known, an operating system provides a common run-time environment on which several user applications can execute. The operating system controls access to various hardware resources (e.g., memory, disk, network interface card, etc.). Each operating system accepts commands according to corresponding syntax/semantic. For example, for an operation to copy a file from one location to another, Unix operating system requires a command with text 'cp', while Windows operating system requires a command with text 'copy'.

Installer system 160 provided according to several aspects of the present invention simplifies the installation of a software module on heterogeneous remote systems 110A-110Y as described below with examples. In one embodiment, such features are operative by execution of software instructions constituting interface tool 150, and accordingly the description below is provided with respect to interface tool 150.

3. Installing a Software Module on Heterogeneous Remote Systems

Figure 2:
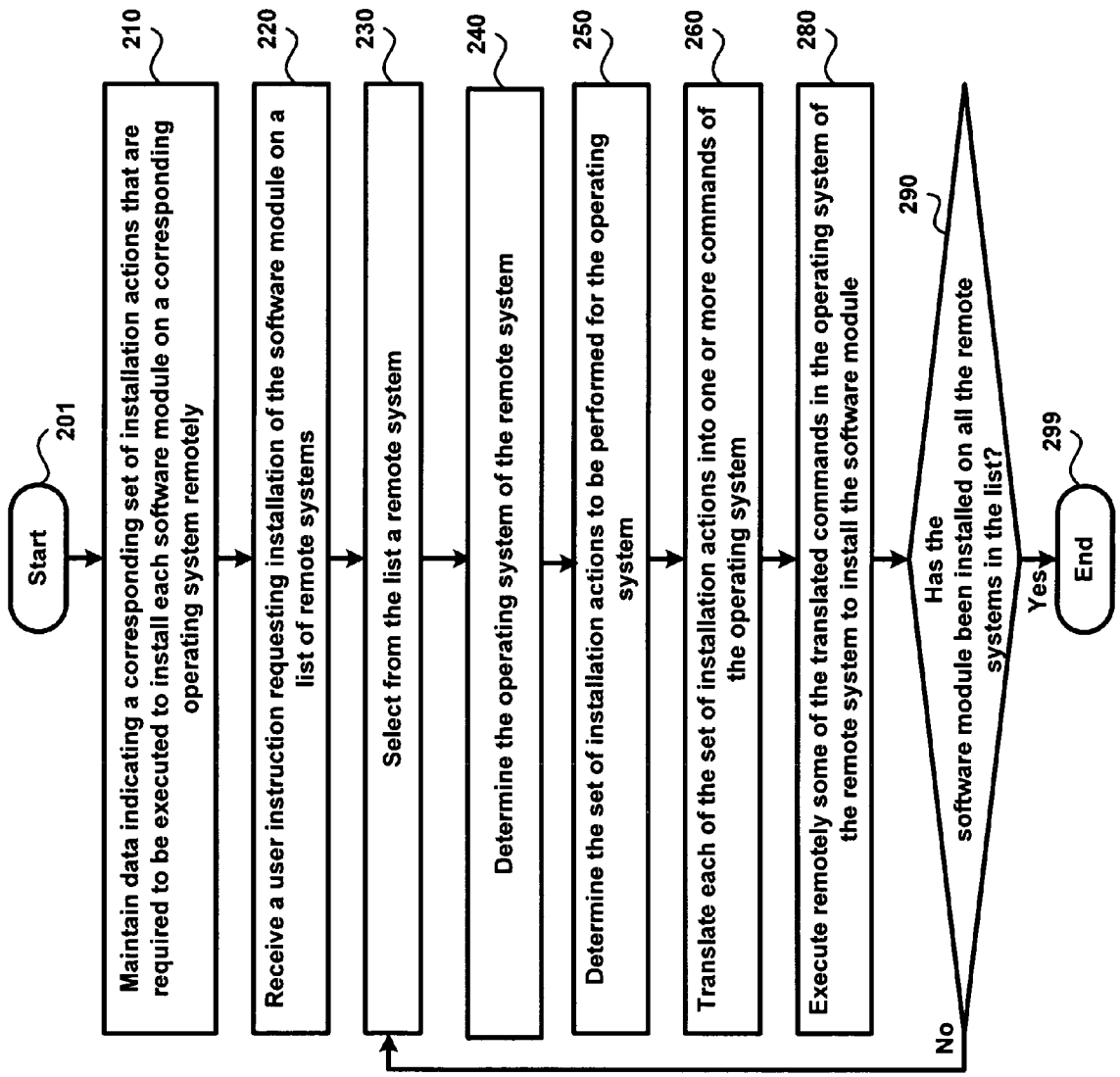
FIG. 2 is a flow chart illustrating the manner in which software modules can be installed on different remote systems according to an aspect of the present invention.

FIG. 2 depicts a flow chart illustrating the manner in which installation of a software module on heterogeneous remote systems is simplified according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, interface tool 150 maintains data indicating a corresponding set of installation actions that are required to be executed to install each software module on remote systems (110A-110Y) pre-installed with a corresponding operating system. It should be appreciated that the set of installation actions can be different for different modules and thus the maintained data may indicate the actions to be performed for each combination of a software module and a operating system (of the remote system). As described in the Background section, diffection sets of installation actions is necessitated by the heterogeneity of the remote systems, in terms of the hardware constituting the systems, pre-installed softwares/operating systems, communication protocols supported, etc.

In general, the set of the installation actions corresponding to an operating system is designed to store the software module (or a flavor thereof, as suited for the environment of the respective remote systems) in appropriate storage locations in the remote system and also to perform the configurations in the remote system that are required to make the software module ready for execution. The set of installation actions (and the specific flavor of the software module) corresponding to each operating system may be maintained in data store 180 or in a local storage (not shown) associated with installer system 160.

In step 220, interface tool 150 receives a user instruction requesting installation of a software module on a list of remote systems (a subset of remote systems 110A-110Y). The user instruction may be received from a user/administrator using an appropriate interface provided on a display unit (not shown in FIG. 1) associated with installer system 160. Alternatively, the user instruction may be received as a request from a different system, for example, a management system used by an administrator to manage the installation of the software module.

The list of remote systems may be received in any convenient manner/format, for example, as a list of IP addresses corresponding to the remote systems. Alternatively, the list may be contained in a file at a pre-specified location or specified by the user interactively. In general, the list contains identifiers that uniquely identifies each of the remote systems on which the software module is sought to be installed. The user instruction may also indicate an identifier/name of the software module sought to be installed (for example, to facilitate identification of the set of installation actions).

In step 230, interface tool 150 selects a remote system from the list. The selection of the remote system may be performed using different techniques as will be apparent to one skilled in the arts. In one technique, the remote systems are selected in the order specified by the list.

In another technique, each of the remote systems in the list is associated with a corresponding flag, with the value of the flag indicating whether the corresponding remote system has been installed with the software module (value "T") or not (value "F"). Thus, during the performance of step 230, remote systems having a flag value of "F" are consecutively selected.

In step 240, interface tool 150 determines the operating system of the selected remote system. In an embodiment, the user is required to maintain the information manually (i.e., to specify the operating system for each remote system, for example, in the form of a table). However, to the extent, an operating system has built-in utilities to respond to queries (on a network) and provide an identifier of the operating system as a response, such an utility can be conveniently invoked from the interface tool, to determine the operating system of the remote system.

In step 250, interface tool 150 identifies the set of installation actions to be performed for the operating system of the selected remote system. The installation action may be identified based on the data maintained in step 210 and the specific software module sought to be installed, the operating system of installer system 160 and the operating system of the selected remote system.

In step 260, interface tool 150 translates each of the identified set of installation actions into one or more commands of the determined operating system. It should be appreciated that the syntax and semantics of each command depend on the interface requirements of the operating system on the remote systems. On the other hand, the installation actions are at a more abstract level and therefore simplify the task of a programmer when specifying the installation logic for many software modules.

The translation of each of the installation actions may thus be performed based on the commands (syntax/semantics) supported by the operating system of the selected remote system (and/or the installer system). It may be appreciated that the translation of the installation actions to appropriate commands (step 260) and the remote execution of translated commands (step 280) are performed automatically (i.e., without requiring manual intervention/inputs) by interface tool 150. Such a feature would be desirable at least in an environment containing heterogeneous remote systems (as described above in FIG. 1).

In step 280, interface tool 150 executes remotely the translated commands in the operating system of the selected remote system to install the software module. Thus, packets are sent on network 120 with appropriate content, which is designed to cause the remote system to receive the content and execute the translated commands specified therein. The remote system may send back a response confirming the status of execution and/or other status. A file representing the software module may also be sent along with the commands. Alternatively, the file may be network accessible and thus only the identifier of the file may be sent.

In step 290, interface tool 150 checks whether the software module has been installed in all the remote systems in the list. The checking may be performed according to the manner of selection described above with respect to step 230. Thus, in the technique where the remote systems are selected in the order specified by the list, interface tool 150 may check whether the end of the list is reached, for example, by checking for a specific keyword indicating the end of the list.

Alternatively, in the technique where each of the remote systems is associated with a corresponding flag, interface tool 150 may first set the flag associated with the selected remote system to the value "T" indicating that the software module has been installed in the selected remote system. Interface tool 150 may then check whether there exists at least one remote system having a flag value of "F" (indicating the presence of unselected remote systems). Control passes to step 230, if there is at least one remote system on which the software module needs to be installed and to step 299 otherwise. The flow chart ends in step 299.

Thus, the same software module (or flavors thereof) is installed on a list of heterogeneous remote systems. Though the flowchart above is described with respect to a single software module being installed, it may be appreciated that the features described below may be extended for the installation of multiple software modules, as will be apparent to one skilled in the relevant arts by reading the disclosure provided herein.

The features described above can be implemented using different approaches. The description is continued with respect to an example software architecture of the interface tool.

4. Interface Framework

Figure 3:
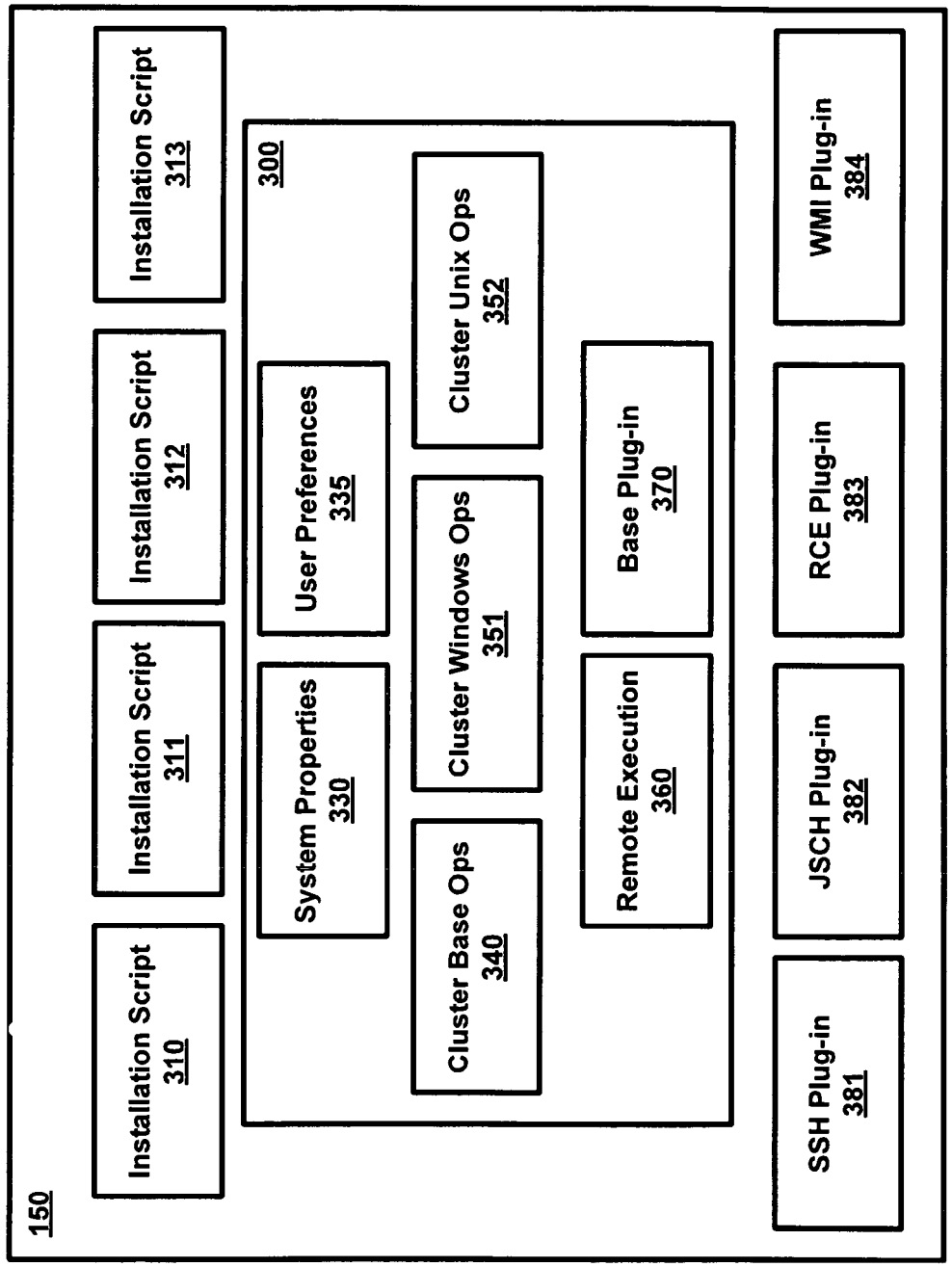
FIG. 3 is a block diagram illustrating the details of an installer system in an embodiment.
Figure 4:
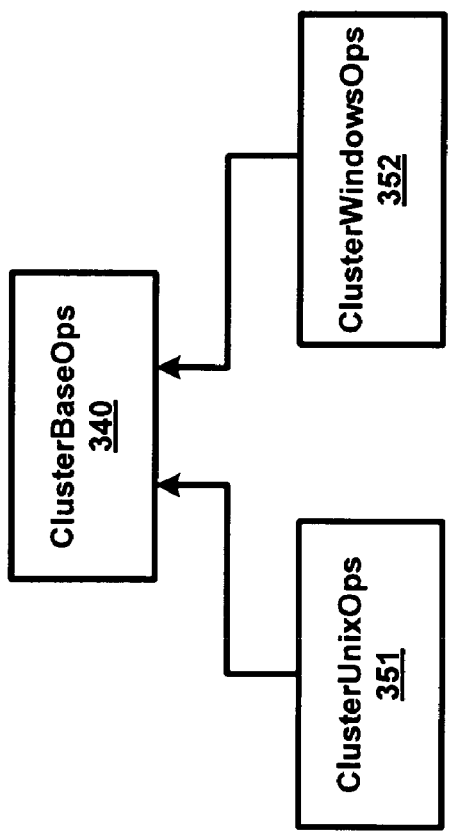
FIG. 4 is a block diagram illustrating the manner in which an installation action is translated into commands of different syntax/semantics of the respective operating systems, in an embodiment.
Figure 5:
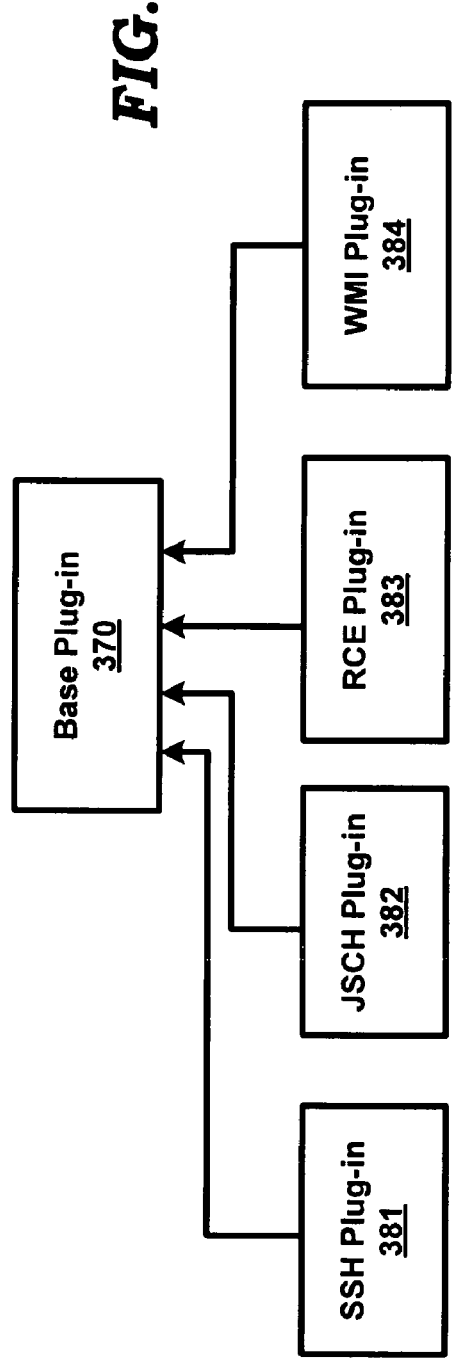
FIG. 5 is a block diagram illustrating the manner in which commands are executed in remote system in an embodiment.

FIGS. 3, 4 and 5 together illustrate the architecture of interface tool 150 in one embodiment. In an embodiment, interface tool 150 forms part of Oracle Enterprise Manager product (available from Oracle Corporation, the intended assignee of the subject patent application) and assists in installing Oracle Agents/databases (software modules) in one or more heterogeneous remote systems 110A-110Y.

The description is continued assuming that commands are remotely executed on remote systems using technologies well known in the relevant arts such as Windows Management Instrumentation (WMI) and Remote Command Execution (RCE) for Windows family of operating systems, and Secure Shell (SSH) and Java Secure Channel (JSCH) for Unix/Linux family of operating systems. However, any technology facilitating remote execution of commands in the corresponding operating system may be used (in combination with the above named technologies) for providing several features of the present invention, as will be apparent to one skilled in the relevant arts.

Broadly, the code blocks within interface tool 150 is first described with respect of FIG. 3 followed by the description of the relationships/hierarchy existing among the code blocks with respect to FIGS. 4 and 5. Each of the Figures is described in detail below.

FIG. 3 is a block diagram illustrating various code blocks that may be implemented within interface tool 150 according to an aspect of the present invention. Interface tool 150 is shown containing installation scripts 310-313, framework 300 and plug-ins such as SSH plug-in 381, JSCH plug-in 382, RCE plug-in 383 and WMI plug-in 384.

Framework 300 is shown containing system properties 330, user preferences 335, cluster base ops (operations) 340, cluster Windows ops 351, cluster Unix ops 352, remote execution 360, and base plug-in 370. Each code block may represent a static software code, in contrast to instances (described in sections below) which are dynamically created and present during execution.

It should be appreciated that each code block is implemented as a class and accordingly when the context permits the code blocks (or the corresponding instances after instantiation) are also referred to as classes in the description below. As is well known, each class may contain methods and variables (either visible only locally or to external classes), with one of the methods (named "main") containing the instructions to be initially executed.

Furthermore, the names of the methods and classes are chosen to closely describe the function (utility) provided by the corresponding methods/classes. While only a skeleton of the program logic is provided for conciseness, it should be appreciated that the implementation of the entire program logic(s) will be apparent to one skilled in the relevant arts by reading the disclosure provided herein.

For illustration, the applicable software code for each of the modules is shown in terms of pseudo-code similar to Java™ language (available from Sun Microsystems), well known in the relevant arts. However, several embodiments of present invention can be implemented using other languages, without departing from the scope and spirit of the present invention, as will be apparent to one skilled in the relevant arts by reading the disclosure provided herein.

Referring to FIG. 3, each plug-in is designed consistent with the specific interface requirements of the remote system. In general, each plug-in sends appropriate packets to establish communication with the corresponding operating system and executes the commands related to the installation actions on the remote system. Each command is executed by encoding text representing the command in a packet according to an appropriate format and sending such packets on network 120. The plug-ins can similarly be used to send a file containing the software module as well.

As further described below, more than one plug-in may be provided for the same operating system. For example, a WMI plug-in (using WMI technology for remote execution of commands) and a RCE plug-in (using RCE technology for remote execution of commands) may be commonly provided associated with Windows Operating System. Similarly, different plug-ins using SSH and JSCH technologies may be provided associated with Linux/Unix operating systems.

Each installation script 310-313 is implemented for a corresponding operating system and a software module (sought to be installed) combination. For example, installation scripts 310 and 311 may contain actions to be performed for installing the software module (or flavors thereof) for UNIX and Windows operating systems respectively.

A user may therefore execute a desired installation script to provide the corresponding user instruction. A desired installation script may be invoked using the following program logic:

```
public class Test{
    public static void main (String[ ] args) {
        String [ ] nodeNames = {"10.177.250.211",
        "10.177.250.212", "10.177.250.213"};
        UserPreferences u1 = new UserPreferences( );
        InterfaceFramework framework = new InterfaceFramework( );
        framework.installOnWindows("M1", nodeNames, u1);
    }
}
```

The variable nodeNames indicates the IP addresses of the remote systems (having Windows operating system) where the software module is sought to be installed. Class UserPreferences enables a user to select the specific plug-in to be used for remote execution of commands as described below.

Class InterfaceFramework represents framework 300 which provides the various functionalities of that framework as corresponding methods. On instantiation (that is creation of an instance of the class using the "new" keyword) of the class InterfaceFramework, instances of other classes in the framework such as remote execution 360, and system properties 330 may be created. Further, instances of plug-ins 381-384 may also be created and made ready for execution, for example, by performing some pre-defined tests.

The method installOnWindows of class InterfaceFramework installs a software module on remote systems pre-installed with Windows operating system. The method is invoked with the identifier of the software module sought to be installed, the list of remote systems and the user preferences. Methods for installing on remote systems pre-installed with other operating systems may similarly be provided.

On execution, method installOnWindows executes the specific one of installation scripts (for example, 311, identified as class M1Win2WinScript below) to be used for installing the software module (identifier "M1") on remote systems pre-installed with Windows operating system. The class M1Win2WinScript may be implemented as follows:

```
public class M1Win2WinScript {
    public void install(String[ ] nodeNames, UserPreferences u1,
String shPath, String remoteInstallLocation)
    {
        ClusterBaseOps sbs = ClusterBaseOps.getInstance( );
        sbs.areNodesAlive(nodeNames, 5);
        System.setProperty(Constants.-
        REMOTENODES_PLATFORM_PROPERTY, "912");
        System.setProperty(Constants.-
        PATH_PROPERTIES_LOC_PROPERTY,
"c:\\RemoteCommandWMI");
        System.setProperty(Constants.-
        WIN_WIN_PLUGIN_SERVICE_NAME,
"c:\\RCE.EXE");
        sbs.startup(nodeNames, "ST-IDC\\ipall", "gnuworld3@1", u1);
        sbs.createDirInNode(nodeNames[0], "c:\\Temp\\setup");
        ClusterResult cr = sbs.copyFileToNodes(shPath, nodeNames,
"c:\\Temp\\setup\\setup.exe");
        sbs.runCmdOnNodes("c:\\Temp\\setup\\setup.exe
        " + remoteInstallLocation + " >>
c:\\Temp\\setup\\out.log", null, null, nodeNames);
        sbs.copyFileFromNode(nodeNames [0], "c:\\Temp\\setup\\out.log",
        "c:\\out.log");
        sbs.removeDirRecurseFromNode(nodeNames [0], "c:\\Temp\\setup");
        sbs.shutdown( );
    }
}
```

The method "install" of Class M1Win2WinScript contains the installation actions to be performed for installing the software module "M1" on Windows remote systems from a Windows installer system. The method install is invoked from the method installOnWindows (in class InterfaceFramework) with the list of remote systems "nodeNames", the user preferences "u1" passed as parameters (both of which were received from the user instruction), the location/directory "shPath" in the remote system where the setup files for the software module "M1" are to be copied and the location/directory "remoteInstallLocation" in the remote system where the software module "M1" is to be installed.

As may be readily observed, the installation actions are specified as calls to methods of the ClusterBaseOps class (block 340). An instance of the class ClusterBaseOps is first instantiated and then used to check whether the remote systems are accessible on the network (method areNodesAlive).

The desired values of pre-defined system properties (block 330) are then set. For example, the system property named "REMOTENODES_PLATFORM_PROPERTY", which indicates the operating system of the remote systems is set to the value "912" (corresponding to Windows operating system). The system property "PATH_PROPERTIES_LOC_PROPERTY" is set to the installation path on remote systems, while the value of the system property "WIN_WIN_PLUGIN_SERVICE_NAME" (which indicates the specific plug-in to be used for executing the remote commands) is set to "RCE".

The system properties specified by the user may be stored in a local storage (not shown) in server system 160 and may be used during execution of the various code blocks/modules contained in interface tool 150. In one embodiment, fields corresponding to the system properties are provided in the UserPreferences class, thereby enabling a user to specify the desired values for the properties. The user specified values override the default values of the system properties as indicated above. Thus, a user may indicate another plug-in (such as "WMI") to be used using the UserPreferences class, thereby overriding the default value "RCE" for the plug-in system property.

The startup method of the ClusterBaseOps instance is then invoked with the list of remote system, a username and a password required for accessing the remote systems and the user preferences. After the instance is started up, the desired methods of the class ClusterBaseOps (corresponding to installation actions) are invoked with the corresponding parameters.

For example, the method copyFileToNodes is invoked for copying an installation file named "setup.exe" from the installer system to each of the remote systems/nodes (variable nodeNames). Similarly, other methods such as runCmdOnNodes (for executing the installation file), copyFileFromNode (for getting the log file containing the result of execution of the installation file), removeDirRecurseFromNode (for removing any directories/files created during setup/installation) are invoked with the corresponding parameters. After the desired methods are invoked, the shutdown method of the CluserBaseOps instance is invoked.

In general, the set of installation actions in the install method are chosen such that the software module "M1" is installed on each of the remote systems pre-installed with Windows operating systems (as indicated by variable nodeNames). Accordingly, different types/number of methods may be provided by ClusterBaseOps class for implementing the desired set of installation actions for a corresponding operating system/software module, as will be apparent to one skilled in the relevant arts by reading the disclosure provided herein.

In one embodiment, ClusterBaseOps is implemented as follows:

```
public class ClusterBaseOps {
    public static ClusterBaseOps getInstance( );
    public void areNodesAlive(String[ ] nodes, int timeout);
    public void startup(String[ ] nodes, String sUsername,
String sPassword, UserPreferences u);
    public void shutdown( );
    public ClusterResult copyFileToNodes(String localFile,
        String[ ] nodes);
    public ClusterResult copyFileToNode(String localFile, String node);
    public ClusterResult copyFileFromNode(String node, String
remoteFile, String localFile);
    public ClusterResult removeFileFromNode(String node, String
        remoteFile);
    public ClusterResult createDirInNode (String node, String
        remoteDir);
    public ClusterResult removeDirFromNode (String node,
        String remoteDir);
    public ClusterResult removeDirRecurseFromNode
        (String node, String remoteDir);
    public ClusterResult runCmdOnNodes(String cmd, String[ ] args,
String[ ] env, String nodeNames);
    public ClusterResult createServiceOnNode(String nodeName,
String servicePath, String serviceName, String serviceArgs);
    public ClusterResult removeServiceOnNode(String nodeName,
String servicePath, String serviceName);
    }
```

It may be appreciated that the class ClusterBaseOps provides a generic implementation for each of the installation actions. In one embodiment, each installation action is translated into one or more commands of the installer/remote operating system, which are then executed locally/remotely to effect the installation action. The translated commands are often generic commands (such as "mkdir" for creating a new directory) that may be executed on more than one operating system.

ClusterWindowsOps 351 and ClusterUnixOps 352 represent classes that translate installation actions to commands specific to the corresponding operating systems. For example, the installation action copyFileToNode may be translated into the corresponding "copy" and "cp" commands of the Windows and UNIX operating systems respectively.

In one embodiment, the classes 351 and 352 implement the installation actions similar to ClusterBaseOps 340 by inheriting and overriding the methods of ClusterBaseOps as shown in FIG. 4. Similarly, other cluster operation classes may be implemented to translate the installation actions to commands corresponding to other/new operating systems.

Thus, the cluster operation classes translate the installation actions to one or more commands that are to be executed locally or remotely. Local commands are executed on installer system 160 in a known way, as will be apparent to one skilled in the relevant arts. Remote commands are execute remotely on the remote systems using an instance of the RemoteExecution class (block 360).

For example, in a scenario that the operating systems (of the selected remote system and the installer system) support compress/uncompress commands, the installation action of copying a directory may be translated as three commands—a first command to compress the contents of the directory, a second command to send the compressed contents to the remote system and a third command to uncompress the contents in the remote system. The first command is executed locally.

RemoteExecution class enables commands to be remotely executed on one or more remote systems pre-installed with a corresponding operating system. RemoteExecution class may be implemented as follows:

```
public class RemoteExecution {
    public CommandResult runcmd(NodeInfo nodeinfo,
String[ ] cmdarr, String[ ] input, String[ ] env);
    public CommandResult runCmdSSH(NodeInfo nodeinfo,
        String[ ] cmdarr, String[ ] input,
        String[ ] env);
    public CommandResult runCmdJSCH(NodeInfo nodeinfo,
        String[ ] cmdarr, String[ ] input, String[ ] env)
        public void RegisterPlugin (BasePlugin pluginName);
        public  static  String[ ]   FormulateCommand
(Session   sess,   String   RemoteShell,
String RemoteShellArgs, String RemoteCommand,
String RemoteCmdArgs);
        }
```

According to an aspect of the present invention, the RemoteExecution class maintains multiple plugins, with each plugin designed to receive and execute remotely commands of a corresponding operating systems pre-installed on one or more remote systems. The plugins may be added to interface framework 300 using the RegisterPlugin method (which requires a parameter of type BasePlugin).

Thus, each plugin may be required to inherit and override the methods of the BasePlugin class (block 370). The BasePlugin class may be implemented as follows:

```
public interface BasePlugin{
    public CommandResult runcmd(NodeInfo nodeinfo, String[ ] cmdarr,
String[ ] input, String[ ] env);
    public String[ ] getOutput( );
    public String getOutputString( );
    public String getErrorString( );
    public String[ ] getError( );
    public int getExitValue( );
    public void ScpTo (NodeInfo nodeinfo, String localFile,
        String remoteFile);
    public void ScpFrom (NodeInfo nodeinfo, String localFile,
        String remoteFile);
```

-continued

```
public static String[ ] FormulateCommand (Session sess,
    String RemoteShell, String
RemoteShellArgs, String RemoteCommand, String RemoteCmdArgs);
}
```

The BasePlugin class provides a common interface for implementing a plugin. Different plugins such as SSHPlugin 381, JSCHPlugin 382, RCEPlugin 383 and WMIPlugin 384 may be required to inherit and overide the methods of Base-Plugin 370 as shown in FIG. 5. SSHPlugin 381 and JSCHPlugin 382 are designed to receive and execute remotely commands of Linux/Unix operating system (using different softwares pre-installed in the remote system) while RCEPlugin 383 and WMIPlugin 384 receive and execute remotely commands of Windows operating system. Though not shown, other plugins for receiving and executing remotely commands of other/new operating systems may be similarly implemented.

Thus, RemoteExecution class maintains a list of plugins designed to receive and execute remotely commands of a corresponding operating system. On receiving a command to be executed on a remote system pre-installed with a specific operating system (by invocation of the runcmd method with the required parameters), the RemoteExecution class is designed to first determine the plugin corresponding to the specific operating system.

The determination of the plugin to be used may be performed based on the system/user properties specified in the installation script. For example, for the above described installation script, RemoteExecution class may determine that RCEPlugin 383 is to be used for remote execution of the received command (based on the value "RCE" specified for the system property "WIN_WIN_PLUGIN_SERVICE_NAME"). In a scenario that no plugin is specified by the system/user properties, RemoteExecution class may select a default plugin for the operating system (based on a corresponding indication received during registration of the plugin).

The other plugins such as SSHPlugin, JSCHPlugin and WMIPlugin may be similarly implemented (using appropriate software pre-installed with the corresponding operating system) and registered, with the RemoteExecution class containing code for determining the appropriate plugin and executing the commands remotely using the determined plugin.

The FormulateCommand method of the RemoteExecution class is first invoked (from one of the cluster ops classes described above) to generate the commands to be remotely executed based on the operating system. The remotely executable commands are generated according to the syntax/semantics of an operating system by invoking the FormulateCommand method of the plugin determined corresponding to the operating system. Thus, for Linux/Unix operating system a corresponding plugin such as SSHPlugin formulates the command "cp" to perform a copy action, while for Windows operating system a corresponding plugin such as WMIPlugin formulates the command "copy" for the same copy action.

The "runcmd" method of RemoteExecution class is then invoked (from one of cluster ops classes) to execute/perform the formulated commands (which are provided as input parameters) remotely in the corresponding operating systems. The "runcmd" method of RemoteExecution class is designed to invoke the "runcmd" method of the plugin determined for the operating system (preferably the same plugin used for formulating the command), which in turn remotely executes the formulated commands provided as inputs. On completion of execution of the "runcmd" method in the determined plugin, the methods "getOutput" and "getError" may be invoked to respectively receive the output of execution and the details of any errors that occurred during execution. An instance of the class "CommandResult" is generated based on the received output and error. The generated instance is returned as the result of invocation of the run command.

It be may appreciated that different plugins are provided for the same operating system, for example, SSHPlugin and JSCHPlugins for the Unix operating system. Such a feature may be desirable as a fallback mechanism for remote execution of commands. In a scenario that a plugin fails to establish a connection, other plugins for the same operating system could be used to establish connection and remotely execute commands. Alternatively, in a scenario that the user does not indicate any default plugin to be used corresponding to an operating system RemoteExecution class may be designed to check whether the remote operating system supports the software of the specific plugin.

Thus, it may be appreciated that the user instruction of above does not specify the installation actions to be performed for installing the software module on each of the remote systems. The user instruction merely indicates the operating system of the remote systems, with interface framework 300 designed to determine the specific installation actions.

While the description above is provided with respect to installation of new software modules in remote systems, the features can be used to deploy/install patches/upgrades for pre-installed software modules. Such deployment typically entails replacing the pre-installed code/data with new code/data in the corresponding remote systems. The software instructions and/or actions described above may accordingly be suitably modified to transfer the new code/data to the remote system of interest and to store the new code in an appropriate location/directory (overwriting the pre-installed code/data if needed). The design of such software instructions will be apparent to one skilled in the relevant arts by reading the disclosure provided herein.

It should be appreciated that the above-described features of interface tool 150 may be implemented in a combination of one or more of hardware, software, and firmware (though embodiments are described as being implemented in the form of software instructions). The description is continued with respect to an embodiment in which various features are operative by execution of corresponding software instructions.

5. Digital Processing System

Figure 6:
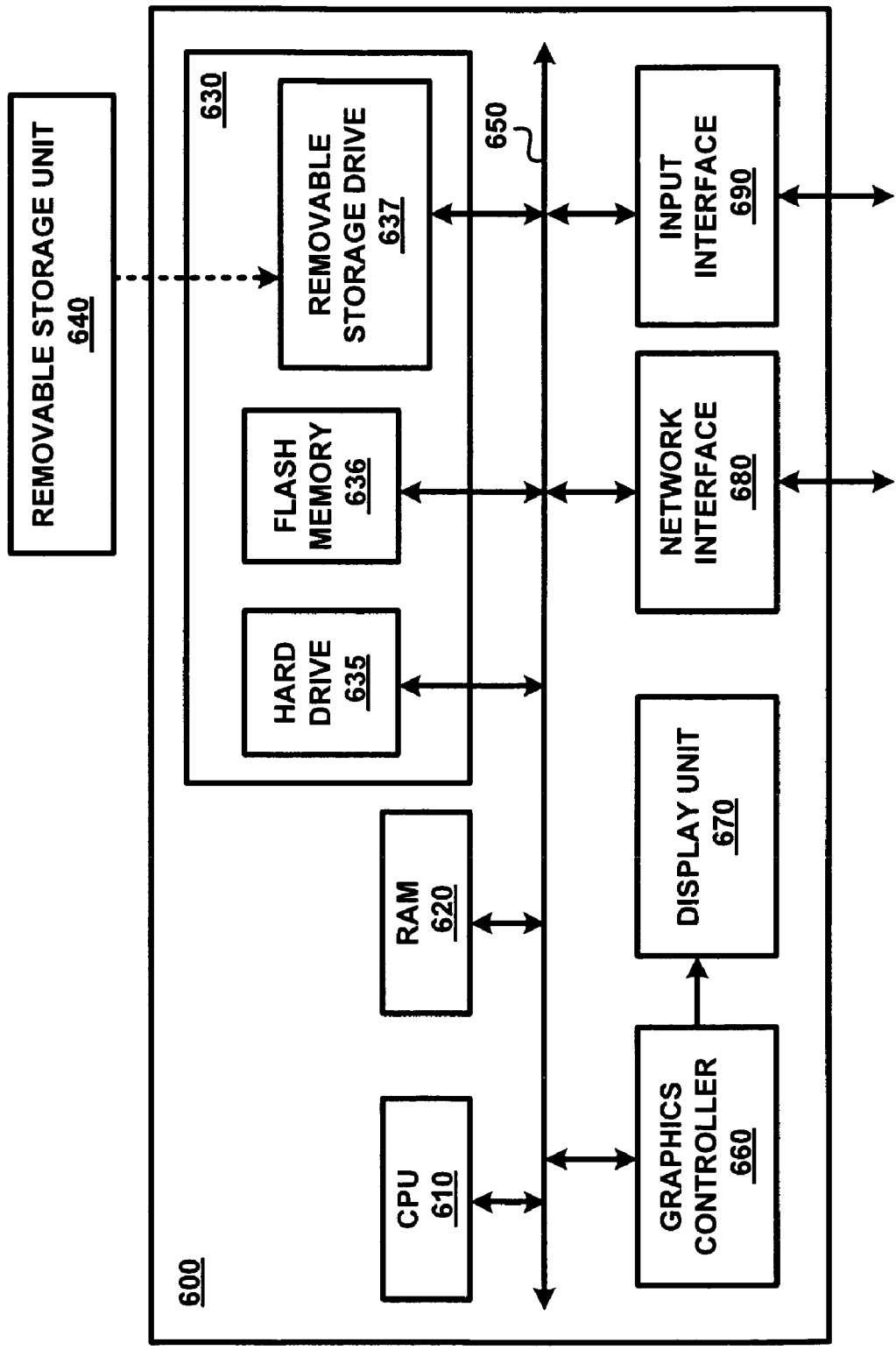
FIG. 6 is a block diagram illustrating the details of a digital processing system in which several aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to any system (e.g., server systems 160, remote systems 110A-10Y and interface tool 150)

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images (e.g., portions of screens) defined by the display signals. Input interface 690 may correspond to a keyboard and a pointing device (e.g., touch-pad, mouse) and may be used to provide inputs (e.g., user requests to perform an operation on a remote system). Network interface 680 provides connectivity to a network (e.g., using Internet Protocol), and may be used to communicate with other connected systems (such as remote systems 110A-110Y, server systems 160 and data store 180) of FIG. 1.

Secondary memory 630 may contain hard drive 635, flash memory 636, and removable storage drive 637. Secondary memory 630 may store the data and software instructions (e.g., steps and corresponding commands to execute to perform an operation on a remote system, details of plug-ins provided with respect to FIGS. 3, 4 and 5), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of installing software modules on a plurality of remote systems of a plurality of operating systems, said method being performed in an installer system coupled to each of said remote systems by a network, said method comprising:

maintaining data indicating a plurality of sets of installation actions, each set of installation actions being required to be executed for installing a corresponding software module on a remote system of a corresponding operating system;

receiving a user instruction requesting installation of a software module on a first remote system and a second remote system, wherein said first remote system and said second remote system are comprised in said plurality of remote systems, said first remote system and said second remote system having a first operating system and a second operating system installed respectively thereon, wherein said first operating system is not the same as said second remote system;

examining said data to determine a first set of installation actions corresponding to said software module and said first operating system, and also a second set of installation actions corresponding to said software module and said second operating system, wherein said first set of installation actions and said second set of installation actions are required to be executed for installing said software module on said first remote system and said second remote system respectively;

translating said first set of installation actions into a first set of commands according to a first syntax/semantics of said first operating system, and said second installation actions into a second set of commands according to a second syntax/semantics of said second operating system; and sending on said network a first set of packets containing said first set of commands to said first remote system and a second set of packets containing said second set of commands to said second remote system, wherein performance of said first set of commands installs said software module on said first remote system and performance of said second set of commands installs said software module on said second remote system.

2. The method of claim 1, further comprising sending a file representing said software module also to each of said first remote system and said second remote system.

3. The method of claim 2, further comprising:
determining whether said first remote system supports decompression of files;
sending said file in a compressed format if said first remote system supports decompression of files; and
including in said first set of packets a command according to said first syntax/semantics to decompress said file in said compressed format.

4. The method of claim 1, wherein said first operating system is Unix operating system and said second operating system is Windows operating system,
whereby said first set of commands comprise a text 'cp' to indicate a copy installation action and said second set of commands comprise a text 'copy' to indicate said copy installation action.

5. A computing system comprising:
a plurality of remote systems of a plurality of operating systems; and
an installer system coupled to each of said plurality of remote systems by a network, said installer system operable to:
maintain data indicating a plurality of sets of installation actions, each set of installation actions being required to be executed for installing a corresponding software module on a remote system of a corresponding operating system;
receive a user request to install a software module on a first remote system and a second remote system, wherein said first remote system and said second remote system are comprised in said plurality of remote systems, said first remote system and said second remote system having a first operating system and a second operating system installed respectively thereon, wherein said first operating system is not the same as said second remote system;
examine said data to determine a first set of installation actions corresponding to said software module and said first operating system, and also a second set of installation actions corresponding to said software module and said second operating system, wherein said first set of installation actions and said second set of installation actions are required to be executed for installing said software module on said first remote system and said second remote system respectively;
translate said first set of installation actions into a first set of commands according to a first syntax/semantics of said first operating system, and said second installation actions into a second set of commands according to a second syntax/semantics of said second operating system; and
send on said network to said first remote system said first set of commands and also send on said network to said second remote system said second set of commands,
wherein execution of said first set of commands installs said software module on said first remote system, and execution of said second set of commands installs said software module on said second remote system,
wherein at least one said first remote system, said second remote system and said installer system comprises a processor and a memory, said processor to retrieve instructions from said memory and to execute the retrieved instructions.

6. The computing system of claim 1, wherein said installer system sends a file representing said software module also to each of said first remote system and said second remote system.

7. The computing system of claim 1, wherein said first operating system is Unix operating system and said second operating system is Windows operating system,
whereby said first set of commands comprise a text 'cp' to indicate a copy action and said second set of commands comprise a text 'copy' to indicate said copy action.

8. The computing system of claim 1, wherein said first set of installation actions and said second set of installation actions are based on a specification of a common set of installation actions,
wherein a programmer, for installation of a same software module, can specify different sets of installation actions for different operating systems using said common set of installation actions.

9. The computing system of claim 8, wherein said examine, said translate and said send are performed by execution of corresponding software instructions such than manual intervention by users is reduced for installation of software modules on remote systems of different operating systems.

10. The computing system of claim 8, wherein each of said first set of installation actions and said second set of installation actions is maintained as a corresponding executable installation script,
wherein said installer system is operable to execute the installation script corresponding to said first set of installation actions, wherein said translate and said send are performed during said execution of the installation script.

11. The computing system of claim 8, wherein said installer system, to perform said send, sends each of said first set of commands to said first remote system only after receiving from said remote system, a result of execution of a previously sent command.

12. The computing system of claim 11, further comprising providing a first result of execution of an installation action based on result of execution of corresponding translated commands, and
wherein said first result is provided stored in a variable.

13. A non-transitory computer readable medium storing one or more sequences of instructions for causing an installer system to install software modules on a plurality of remote systems of a plurality of operating systems, wherein execution of said one or more sequences of instructions by one or more processors contained in said network monitoring system causes said installer system to perform the actions of:
maintaining data indicating a plurality of sets of installation actions, each set of installation actions being required to be executed for installing a corresponding software module on a remote system of a corresponding operating system;
receiving a user instruction requesting installation of a software module on a first remote system and a second remote system, wherein said first remote system and said second remote system are comprised in said plurality of remote systems, said first remote system and said second remote system having a first operating system and a second operating system installed respectively thereon, wherein said first operating system is not the same as said second remote system;
examining said data to determine a first set of installation actions corresponding to said software module and said first operating system, and also a second set of installation actions corresponding to said software module and said second operating system, wherein said first set of installation actions and said second set of installation actions are required to be executed for installing said software module on said first remote system and said second remote system respectively;

translating said first set of installation actions into a first set of commands according to a first syntax/semantics of said first operating system, and said second installation actions into a second set of commands according to a second syntax/semantics of said second operating system; and sending on said network a first set of packets containing said first set of commands to said first remote system and a second set of packets containing said second set of commands to said second remote system, wherein performance of said first set of commands installs said software module on said first remote system and performance of said second set of commands installs said software module on said second remote system.

14. The non-transitory computer readable medium of claim 13, further comprising sending a file representing said software module also to each of said first remote system and said second remote system.

15. The non-transitory computer readable medium of claim 14, further comprising:

determining whether said first remote system supports decompression of files;

sending said file in a compressed format if said first remote system supports decompression of files; and including in said first set of packets a command according to said first syntax/semantics to decompress said file in said compressed format.

16. The non-transitory computer readable medium of claim 13, further comprising:

providing a plurality of plug-in modules, each designed to interface with the corresponding operating system on a remote system over said network and to execute each of said commands on the remote system; and if a command cannot be execute on the remote system using one plug-in, executing said command on the remote system using another plug-in.

17. The non-transitory computer readable medium of claim 16, wherein a first plug-in and a second plug-in are provided for a same operating system, said first plug-in and said second plug-in being contained in said plurality of plug-in modules, further comprising:

enabling a user to specify one of said first plug-in and said second plug-in associated with same operating system; and executing commands on said same operating system using said specified plug-in in response to said user specifying the plug-in.

18. The non-transitory computer readable medium of claim 13, wherein said first operating system is Unix operating system and said second operating system is Windows operating system, whereby said first set of commands comprise a text 'cp' to indicate a copy installation action and said second set of commands comprise a text 'copy' to indicate said copy installation action.

\* \* \* \* \*

UNITED STATES PATENT AND TRADEMARK OFFICE
CERTIFICATE OF CORRECTION

PATENT NO.           : 8,341,619 B2                                    Page 1 of 1
APPLICATION NO.      : 12/464901
DATED                : December 25, 2012
INVENTOR(S)          : Pall et al.

It is certified that error appears in the above-identified patent and that said Letters Patent is hereby corrected as shown below:

In the Specifications

In column 9, line 16, delete "CluserBaseOps" and insert -- ClusterBaseOps --, therefor.

In column 11, line 10, delete "overide" and insert -- override --, therefor.

In column 12, line 56, delete "110A-10Y" and insert -- 110A-110Y --, therefor.

In column 12, line 56, delete "150)" and insert -- 150). --, therefor.

Signed and Sealed this
Sixteenth Day of April, 2013

Teresa Stanek Rea
*Acting Director of the United States Patent and Trademark Office*